US 11,495,837 B2

(12) United States Patent
Jung et al.

(10) Patent No.: US 11,495,837 B2
(45) Date of Patent: Nov. 8, 2022

(54) POROUS BODY QUALITY INSPECTION APPARATUS AND METHOD FOR INSPECTING QUALITY OF POROUS BODY

(71) Applicant: LG CHEM, LTD., Seoul (KR)

(72) Inventors: Hye Mi Jung, Daejeon (KR); Kyung Mun Kang, Daejeon (KR); Jae Choon Yang, Daejeon (KR)

(73) Assignee: LG CHEM, LTD., Seoul (KR)

(*) Notice: Subject to any disclaimer, the term of this patent is extended or adjusted under 35 U.S.C. 154(b) by 676 days.

(21) Appl. No.: 16/483,493

(22) PCT Filed: Feb. 12, 2018

(86) PCT No.: PCT/KR2018/001806
§ 371 (c)(1),
(2) Date: Aug. 5, 2019

(87) PCT Pub. No.: WO2018/147695
PCT Pub. Date: Aug. 16, 2018

(65) Prior Publication Data
US 2020/0020988 A1    Jan. 16, 2020

(30) Foreign Application Priority Data
Feb. 13, 2017   (KR) .................. 10-2017-0019120

(51) Int. Cl.
*H01M 10/42* (2006.01)
*H01M 4/88* (2006.01)
(Continued)

(52) U.S. Cl.
CPC ........ *H01M 10/4285* (2013.01); *G01N 15/08* (2013.01); *G01N 27/04* (2013.01);
(Continued)

(58) Field of Classification Search
CPC .. H01M 10/4285; H01M 4/80; H01M 4/8807; H01M 8/0232; H01M 2008/1095;
(Continued)

(56) References Cited

U.S. PATENT DOCUMENTS

2013/0044168 A1* 2/2013 Kaga .................... C09D 11/101
                                                         347/102
2014/0208850 A1* 7/2014 Kim ....................... G01N 29/14
                                                         73/587
(Continued)

FOREIGN PATENT DOCUMENTS

CN        105651432 A    6/2016
JP       2004071456 A    3/2004
(Continued)

OTHER PUBLICATIONS

Li et al. "Measurement and Simulation of Contact Resistance Between Bipolar Plate and Gas Diffusion Layer in PEM Fuel Cell" Journal of Mechanical Engineering. 47(8):159-162 (2011) (with English Abstract).

(Continued)

*Primary Examiner* — Christopher P McAndrew
*Assistant Examiner* — Zannatul Ferdous
(74) *Attorney, Agent, or Firm* — Myers Bigel, P.A.

(57) ABSTRACT

The present application relates to a porous body quality inspection apparatus and a method for inspecting quality of a porous body, and according to one aspect of the present application, there is provided a porous body quality inspection apparatus comprising a contact resistance measuring part of a porous body with a gas diffusion layer, a pressurizing part for pressurizing a pressure-sensitive discoloration base material on the porous body, an image mapping part for calculating a contact area between the pressure-sensitive discoloration base material and the porous body, a trans-
(Continued)

porting part for transporting the porous body and the pressure-sensitive discoloration base material, and an operation part for performing an operation of an interfacial contact resistance between the porous body and the gas diffusion layer.

13 Claims, 4 Drawing Sheets

(51) Int. Cl.
*H01M 4/80* (2006.01)
*G01N 27/04* (2006.01)
*G01N 15/08* (2006.01)
*H01M 8/0232* (2016.01)
*H01M 8/10* (2016.01)

(52) U.S. Cl.
CPC ........... *H01M 4/80* (2013.01); *H01M 4/8807* (2013.01); *H01M 8/0232* (2013.01); *H01M 2008/1095* (2013.01)

(58) Field of Classification Search
CPC ........... H01M 8/04305; H01M 8/0206; H01M 8/0228; G01N 15/08; G01N 27/04; Y02E 60/10; Y02E 60/50
See application file for complete search history.

(56) References Cited

U.S. PATENT DOCUMENTS

| | | | |
|---|---|---|---|
| 2016/0350628 A1* | 12/2016 | Kojo | G06K 15/1219 |
| 2017/0217191 A1* | 8/2017 | Hirokawa | B41J 29/17 |
| 2018/0319038 A1* | 11/2018 | Nagai | B27N 1/029 |

FOREIGN PATENT DOCUMENTS

| | | | |
|---|---|---|---|
| JP | 2006000605 | | 1/2006 |
| JP | 2006244750 | | 9/2006 |
| JP | 2006244750 A | * | 9/2006 |
| JP | 2008041304 A | | 2/2008 |
| JP | 2008157721 | | 7/2008 |
| JP | 2011086635 A | | 4/2011 |
| JP | 2013058414 A | | 3/2013 |
| JP | 2013157314 A | | 8/2013 |
| JP | WO2012032922 A1 | | 1/2014 |
| JP | 5476328 | | 4/2014 |
| JP | 2016085921 | | 5/2016 |
| KR | 1320786 | | 10/2013 |
| KR | 1020160034676 | | 3/2016 |
| KR | 1020160114386 | | 10/2016 |

OTHER PUBLICATIONS

International Search Report corresponding with International Application No. PCT/KR2018/001806, dated May 30, 2018 (4 pages with English translation).
Kim et al, A Study on the Performance of Polymer Electrolyte Fuel Cell Using Metal Foam, Journal of the Korean Institute of Hydrogen and Energy, vol. 26, No. 6, 2015, pp. 554-559 (with English abstract).
Extended European Search Report corresponding to EP 18751648.9, dated Jan. 27, 2020 (10 pages).
Chang et al. "Effect of clamping pressure on the performance of a PEM fuel cell" J of Power Sources, 166(1):149-154 (2007).
Wen et al. "Experimental study of clamping effects on the performances of a single proton exchange membrane fuel cell and a 10-cell stock" J of Power Sources, 192(2):475-485 (2009).
Japanese Office Action corresponding to JP 2019-541274; dated Aug. 18, 2020 (7 pages, including English machine translation).

* cited by examiner

POROUS BODY QUALITY INSPECTION APPARATUS AND METHOD FOR INSPECTING QUALITY OF POROUS BODY

CROSS REFERENCE TO RELATED APPLICATIONS

This application is a 35 U.S.C. 371 national stage application of PCT International Application No. PCT/KR2018/001806, filed Feb. 12, 2018, which claims priority from Korean Patent Application Nos. 10-2017-0019120, filed Feb. 13, 2017, the contents of which are incorporated herein in their entireties by reference. The above-referenced PCT International Application was published in the Korean language as International Publication No. WO 2018/147695 on Aug. 16, 2018.

TECHNICAL FIELD

The present application relates to a porous body quality inspection apparatus and a method for inspecting quality of a porous body.

BACKGROUND ART

Generally, a fuel cell is an energy conversion device that generates electrical energy through an electrochemical reaction between a fuel and an oxidizer and has an advantage that power can be consistently generated as long as the fuel is continuously supplied.

A polymer electrolyte membrane fuel cell (PEMFC) using a polymer membrane capable of permeating hydrogen ions as an electrolyte, has a low operating temperature of about 100° C. as compared to other types of fuel cells, and has advantages of high energy conversion efficiency, high output density and fast response characteristics. Besides, since it can be miniaturized, it can be provided as portable, vehicle and household power supplies.

The polymer electrolyte membrane fuel cell stack may comprise a membrane-electrode assembly (MEA) having an electrode layer formed by applying an anode and a cathode around an electrolyte membrane composed of a polymer material, a gas diffusion layer (GDL) for serving to distribute reaction gases evenly and to transfer generated electric energy, a separating plate (bipolar plate) for supplying the reaction gases to the gas diffusion layer and discharging generated water, and a gasket for preventing leakage of the reaction gases and cooling water between the electrolyte membrane and the separating plate.

Conventional separators each provided with reaction gas channels and cooling water channels on both sides have technical problems of water transfer imbalance in the fuel cell and high mass transfer resistance (usually diffusion resistance) of the reaction gas in the reaction surface, in the high power zone.

Recently, a separator (hereinafter also referred to as a 'porous body'), to which a metal foam or a metal mesh and the like is applied, is proposed to improve performance of a fuel cell through reduction of diffusion resistance in a high power operation zone. The porous body equipped on the surface of the separator in contact with the gas diffusion layer serves to lower the diffusion resistance by allowing the gas diffusion layer and the separator to be partially spaced apart from each other and causing convection and diffusion actions in the spaced space.

However, since the spaced space between the porous body and the gas diffusion layer has a problem that it is difficult to predict interfacial contact resistance between the porous body and the gas diffusion layer, it is necessary to study a method of easily determining the interfacial contact resistance before applying the porous body to the fuel cell stack.

DISCLOSURE

Technical Problem

The present application provides a porous body quality inspection apparatus and a method for inspecting quality of a porous body, which can inspect quality of a porous body by determining interfacial contact resistance between a porous body and a gas diffusion layer generated when the porous body is applied to a fuel cell stack before applying the porous body to the fuel cell stack.

Technical Solution

To solve the above-described problem, according to one embodiment of the present invention, there is provided a porous body quality inspection apparatus comprising a contact resistance measuring part of a porous body with a gas diffusion layer, a pressurizing part for pressurizing a pressure-sensitive discoloration base material on the porous body, an image mapping part for calculating a contact area between the pressure-sensitive discoloration base material and the porous body and an operation part for performing an operation of an interfacial contact resistance between the porous body and the gas diffusion layer.

According to another embodiment of the present invention, there is provided a method for inspecting quality of a porous body comprising steps of measuring a contact resistance between a porous body and a gas diffusion layer, pressurizing a pressure-sensitive discoloration base material safely placed on the porous body to a predetermined pressure, calculating a contact area between the pressure-sensitive discoloration base material and the porous body based on the discolored region of the pressurized pressure-sensitive discoloration base material, and performing an operation of an interfacial contact resistance between the porous body and the gas diffusion layer based on the contact resistance and the contact area.

Advantageous Effects

The porous body quality inspection apparatus and the method for inspecting quality of a porous body according to one embodiment of the present invention have the following effects.

Thermal and electrical loss of the fuel cell stack by the porous body can be quantified, manufacturing tolerance and surface pressure uniformity of the porous body can be quantitatively confirmed, a performance deviation between the individual fuel cell stacks can be reduced, and production management costs can be reduced by accumulating a quality inspection database of the porous body by a specific design.

MODE FOR INVENTION

Hereinafter, the quality inspection apparatus according to one embodiment of the present invention will be described in detail with reference to the accompanying drawings.

In addition, the same or similar reference numerals are given to the same or corresponding components regardless of reference numerals, of which redundant explanations will be omitted, and for convenience of explanation, the size and shape of each constituent member as shown may be exaggerated or reduced.

Figure 1:
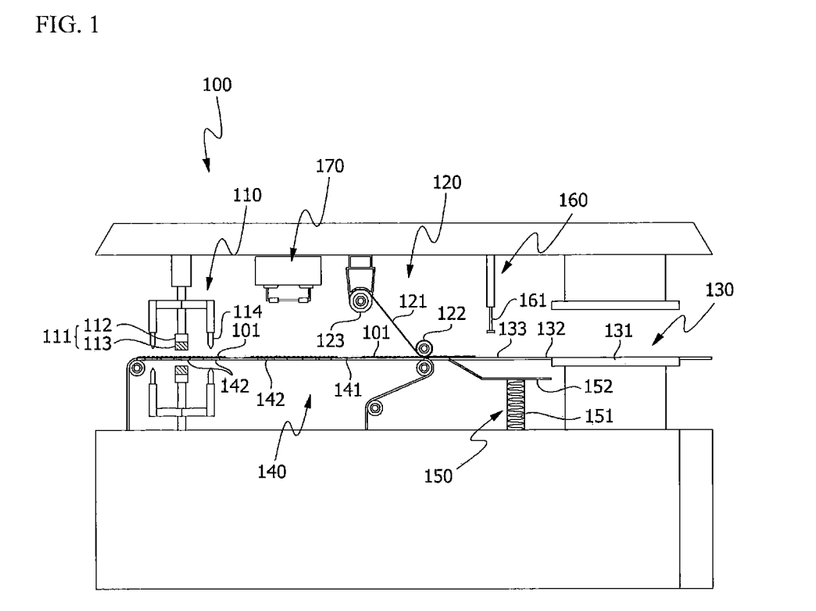
FIG. 1 is a schematic side view of an exemplary porous body quality inspection apparatus of the present application.

FIG. 1 is a schematic side view of an exemplary porous body quality inspection apparatus of the present application.

Figure 2:
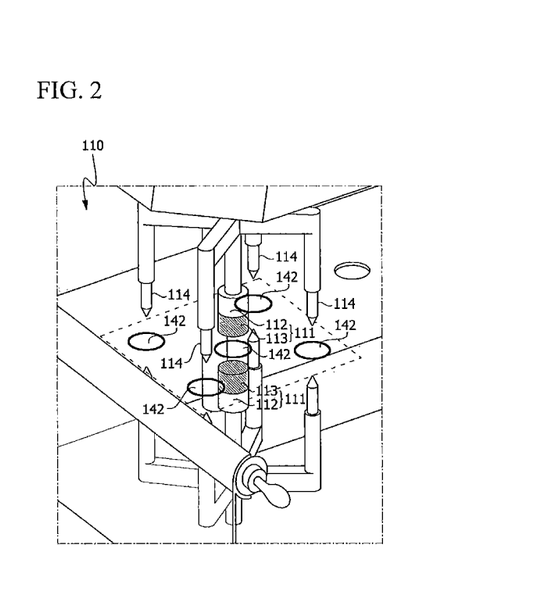
FIG. 2 is a view showing a measuring part of an exemplary porous body quality inspection apparatus of the present application.

FIG. 2 is a view showing a measuring part of an exemplary porous body quality inspection apparatus of the present application.

Figure 3:
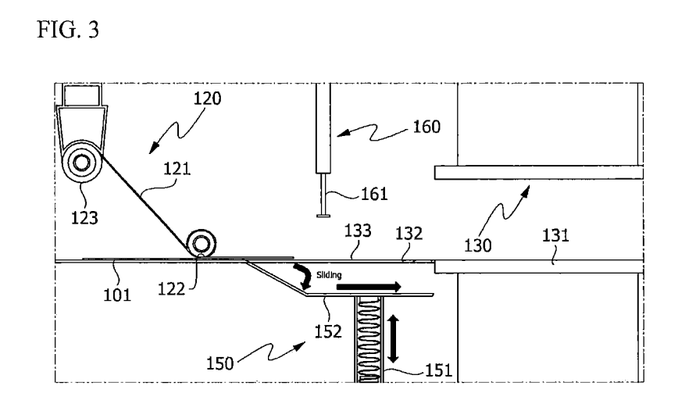
FIG. 3 is a partial side view of an exemplary porous body quality inspection apparatus of the present application.

FIG. 3 is a side view of a pressurizing part, a weight measuring part and an image mapping part of an exemplary porous body quality inspection apparatus of the present application.

Figure 4:
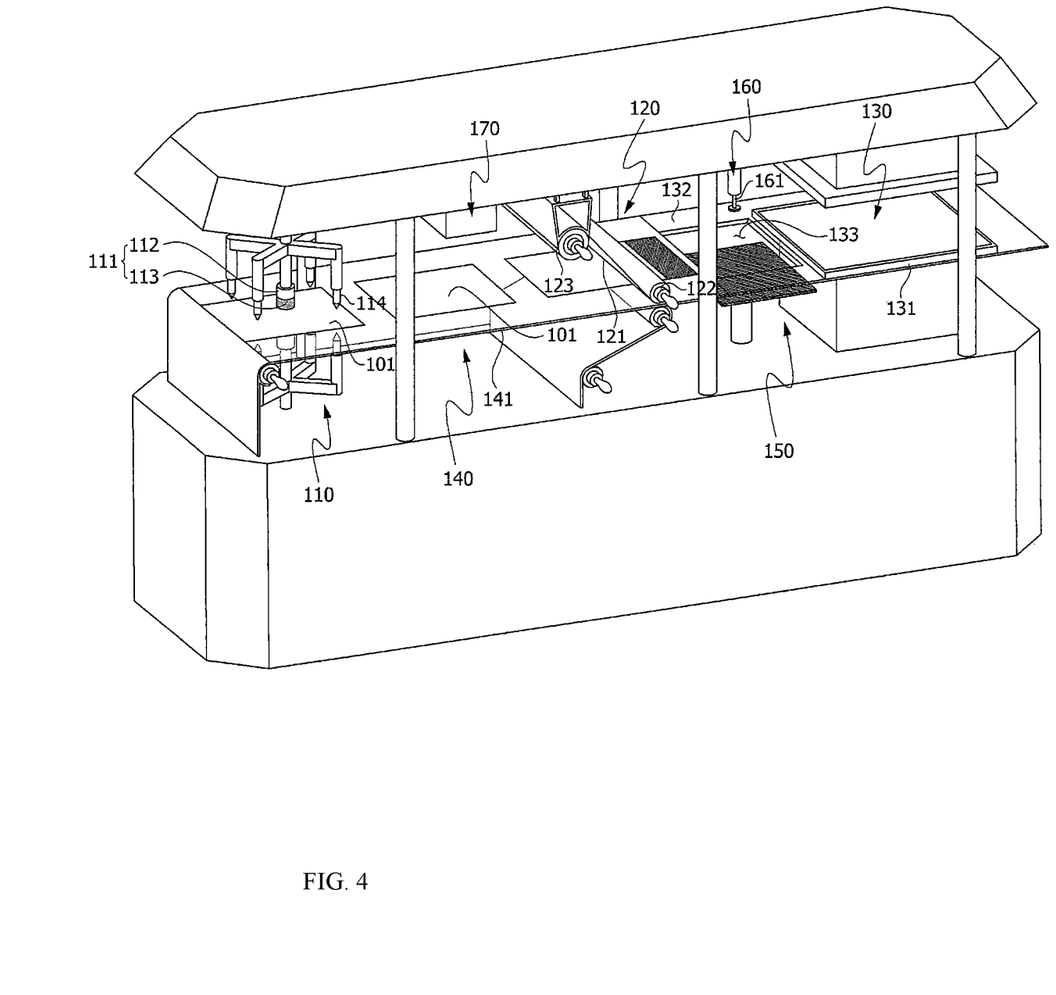
FIG. 4 is a schematic perspective view of an exemplary porous body quality inspection apparatus of the present application.
Figure 5:
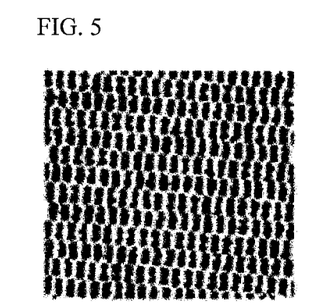
FIG. 5 is a view showing a portion discolored by a pressurizing part of a pressure-sensitive discoloration base material of the present application.

FIG. 4 is a schematic perspective view of an exemplary porous body quality inspection apparatus of the present application.

As shown in FIG. 1, the porous body quality inspection apparatus (100) according to one embodiment of the present application comprises a transporting part (140), a measuring part (110), a pressurizing part (120), a weight measuring part (150), an image mapping part (130), an operation part (not shown), a product selection part (160) and a display part (170). In one embodiment of the present application, each part of the porous body quality inspection apparatus continuously performs a predetermined function on the porous body transported by the transporting part (140) including a conveyor belt (141) equipped with an opening (142), whereby the quality inspection of the porous body (101) can be continuously performed. Hereinafter, each part of the quality inspection apparatus according to one embodiment of the present application will be described in detail.

Referring to FIG. 1, the porous body quality inspection apparatus (100) comprises a measuring part (110). In one example, the measuring part (110) may comprise a holder (112) on which a gas diffusion layer (113) is disposed and a contact resistance measurement sensor (111) in order to measure a contact resistance between the porous body (101) and the gas diffusion layer (113). The contact resistance can be measured by contacting the gas diffusion layer (113) disposed on the holder (112) with one side or both sides of the porous body (101). Particularly, when the contact resistance is measured by contacting the gas diffusion layer (113) with both sides of the porous body (101), the measurement can be performed by contacting the gas diffusion layer (113) disposed on the holder (112) with both sides of the porous body (101) through the opening (142) equipped in the conveyor belt (141), as shown in FIG. 2.

The measuring part (110) may comprise a gauge sensor (114) for measuring the thickness of the porous body (101). The thickness measurement of the porous body (101) can be performed by measuring the thickness of the porous body by the gauge sensor (114) through the opening (142) equipped in the conveyor belt (141), as shown in FIG. 2.

The porous body quality inspection apparatus according to one embodiment of the present application comprises a pressurizing part (120) for pressurizing the pressure-sensitive discoloration base material (121) on the porous body (101). The pressure-sensitive discoloration base material (121) of the present application means a base material whose color changes by mechanical pressure. The kind of the pressure-sensitive discoloration base material (121) is not particularly limited as long as the color of the portion to which the pressure is applied is discolored, but for example, a carbon/carbonizing paper, a pressure-sensitive coating film, a carbonic paper or a film and paper in which microcapsules of a color developer layer are destroyed by pressure and thus the color of the contact surface is changed can be used. In one example, the pressurizing part (120) may comprise a transport roller for safely placing the pressure-sensitive discoloration base material (121) on the porous body (101), and a pressure roller (122) for pressurizing the pressure-sensitive discoloration base material (121) safely placed on the porous body (101) at a predetermined pressure.

The pressurizing part (120) serves to contact the porous body (101) with the pressure-sensitive discoloration base material (121) by pressurizing the pressure-sensitive discoloration base material (121) safely placed on the porous body (101) at a predetermined pressure. The predetermined pressure is a pressure corresponding to a pressure of the porous body (101) in contact with the gas diffusion layer in the fuel cell stack, which means a pressure equal to or having a small error that can be regarded as equal to a pressure that the porous body (101) receives by the gas diffusion layer in the fuel cell stack. When the pressure-sensitive discoloration base material (121) safely placed on the porous body (101) is pressurized to the pressure as above, the porous body (101) and the pressure-sensitive discoloration base material (121) are brought into contact with the porous body (101) at a contact area similar to an aspect that the porous body (101) is in contact with the gas diffusion layer in the fuel cell stack. Therefore, if the area of the discolored region of the pressurized pressure-sensitive discoloration base material (121) is measured, the area of the porous body (101) contacting the gas diffusion layer in the fuel cell stack can be measured.

The pressure that the pressurizing part (120) applies to the pressure-sensitive discoloration base material (121) may be adjusted, for example, by adjusting the position of the pressure roller (122) located at the upper part of the conveyor belt (141). The closer the pressure roller (122) is to the conveyor belt (141), the stronger pressure is applied to the pressure-sensitive discoloration base material (121) by the porous body (101) passing between the pressure roller (122) and the conveyor belt (141). Since the quality inspection apparatus of the present application can control the pressure applied by the pressurizing part (120) even if the specification of the fuel cell stack is changed, it can make the contact area that the porous body (101) is in contact with the pressure-sensitive discoloration base material (121) similar to the contact area that the porous body is in contact with the gas diffusion layer in the fuel cell stack.

In one embodiment of the porous body quality inspection apparatus of the present application, the porous body quality inspection apparatus may comprise a weight measuring part (150) for measuring the weight of the porous body (101). In one example, the weight measuring part (150) may comprise a tray (152) supported by an elastic body (151), in which the porous body (101) transported by the conveyor belt (141) is stacked and housed. In one example, the weight measuring part (150) may inspect the quality of the porous body by measuring the accumulated weight of the porous body (101) transported to the tray (152) through the porous body discharge penetration region (133) equipped in a collection part (132) of the image mapping part (130) based on the up-and-down movement of the elastic body (151), as shown in FIGS. 3 and 4.

The porous body quality inspection apparatus of the present application comprises an image mapping part (130) for calculating a contact area between the pressure-sensitive discoloration base material (121) and the porous body (101) based on the discolored region of the pressurized pressure-sensitive discoloration base material. Since the pressurizing part (120) pressurizes the pressure-sensitive discoloration base material (121) safely placed on the porous body (101) to the pressure corresponding to the pressure that the porous body receives by the gas diffusion layer in the fuel cell stack, the contact area between the porous body (101) and the pressure-sensitive discoloration base material (121) calculated in the image mapping part (130) is similar to the area in which the porous body contacts the gas diffusion layer in the fuel cell stack. In one example, the image mapping part (130) of the present application may comprise a collection part (132) for separately collecting the pressurized pressure-sensitive discoloration base material (121) from the porous body (101), a porous body discharge penetration region (133) and a scanner (131) for scanning the discolored region of the pressure-sensitive discoloration base material (121), as shown in FIG. 4. In one embodiment of the porous quality inspection apparatus of the present application, the porous body (101) transported by the transporting part (140) is housed in the tray (152) of the weight measuring part (150) through the porous body discharge penetration region (133) equipped in the collection part (132), and the pressure-sensitive discoloration base material (121) passing through the pressurizing part (120) via the pressure-sensitive discoloration base material transport roller (123) and the transporting part (140) is separated from the porous body (101) and collected into the image mapping part (130), while being supported by the collection part (132), as shown in FIG. 3.

The porous body quality inspection apparatus of the present application comprises an operation part (not shown) for performing an operation of an interfacial contact resistance between the porous body and the gas diffusion layer (113) based on the contact resistance measured by the measuring part (110) and the contact area calculated by the image mapping part (130). In the present application, the term "interfacial contact resistance" means a contact resistance generated by contact of two objects multiplied by a contact area of two objects. The operation part performs an operation of an interfacial contact resistance by Equation 1 below.

$$ICR = R_{BP|GDL} \times AC_{actual} \qquad \text{[Equation 1]}$$

In Equation 1, ICR is an interfacial contact resistance between the porous body and the gas diffusion layer, $R_{BP|GDL}$ is a contact resistance between the porous body and the gas diffusion layer, and $AC_{actual}$ is a contact area between the pressure-sensitive discoloration base material and the porous body calculated based on the discolored region of the pressurized pressure-sensitive discoloration base material. By performing an operation of the interfacial contact resistance between the porous body and the gas diffusion layer (112) through the process as above, the thermal and electrical losses of the fuel cell stack by the porous body can be predicted, whereby the fuel cell stack having excellent reliability, productivity and power generation efficiency can be manufactured.

In one example, the porous body quality inspection apparatus of the present application may further comprise a product selection part (160) including a vacuum adsorption part (161). The product selection part (160) may serve to spatially separate a porous body that does not satisfy a predetermined criterion from a porous body that satisfies a predetermined criterion, and for example, it may serve to remove a porous body, which does not satisfy the predetermined criterion, housed in the tray (152) from the tray (152).

In one example, the porous body quality inspection apparatus of the present application may further comprise a display part (170) that outputs one or more of a contact resistance, a contact area and an interfacial contact resistance. The display part (170) outputs matters concerning the quality of the porous body such as the contact resistance, the contact area and the interfacial contact resistance, so that information on the quality of the porous body can be visually confirmed.

The present application also relates to a method for inspecting quality of a porous body.

The method for inspecting quality of a porous body of the present application comprises steps of measuring a contact resistance between a porous body and a gas diffusion layer, pressurizing a pressure-sensitive discoloration base material placed on the porous body to a predetermined pressure, calculating a contact area between the pressure-sensitive discoloration base material and the porous body based on the discolored region of the pressurized pressure-sensitive discoloration base material, and performing an operation of an interfacial contact resistance between the porous body and the gas diffusion layer based on the contact resistance and the contact area.

Hereinafter, each step of the method for inspecting quality of a porous body will be described in detail.

The method for inspecting quality of a porous body of the present application comprises a step of measuring a contact resistance between a porous body and a gas diffusion layer. The measurement of the contact resistance between the porous body and the gas diffusion layer can be performed by measuring the contact resistance generated by contacting the gas diffusion layer used in the fuel cell into contact with the porous body. In one example, the measurement of the contact resistance may be performed by contacting the gas diffusion layer of the contact resistance sensor including the holder, in which the gas diffusion layer is disposed, with the porous body.

The method for inspecting quality of a porous body of the present application comprises a step of pressurizing a pressure-sensitive discoloration base material safely placed on the porous body to a predetermined pressure. In one example, the pressure-sensitive discoloration base material can be safely placed on the porous body by the pressure-sensitive discoloration base material transport roller, and the pressure-sensitive discoloration base material safely placed on the porous body can be pressurized by the pressure roller. The predetermined pressure is a pressure that corresponds to a pressure of the porous body in contact with the gas diffusion layer in the fuel cell stack, which means a pressure equal to or having a small error that can be regarded as equal to a pressure that the porous body receives by the gas diffusion layer in the fuel cell stack. When the pressure-sensitive discoloration base material safely placed on the porous body is pressurized to the pressure as above, the porous body and the pressure-sensitive discoloration base material are brought into contact with the porous body at a contact area similar to an aspect that the porous body is in contact with the gas diffusion layer in the fuel cell stack. Therefore, if the area of the discolored region of the pressurized pressure-sensitive discoloration base material is measured, the area of the porous body contacting the gas diffusion layer in the fuel cell stack can be measured.

The method for inspecting quality of a porous body of the present application comprises a step of calculating a contact area between the pressure-sensitive discoloration base material and the porous body based on the discolored region of the pressurized pressure-sensitive discoloration base material. In one example, a method of scanning the discolored region of the pressurized pressure-sensitive discoloration base material with a scanner and then calculating the area of the discolored region can be used for the calculation of the contact area.

The method for inspecting quality of a porous body of the present application comprises a step of performing an operation of an interfacial contact resistance between the porous body and the gas diffusion layer based on the contact resistance and the contact area. The interfacial contact resistance can be subjected to an operation by Equation 1 below.

$$ICR = R_{BP|GDL} \times AC_{actual} \qquad \text{[Equation 1]}$$

In Equation 1, ICR is an interfacial contact resistance between the porous body and the gas diffusion layer, $R_{BP|GDL}$ is a contact resistance between the porous body and the gas diffusion layer, and $AC_{actual}$ is a contact area between the pressure-sensitive discoloration base material and the porous body calculated based on the discolored region of the pressurized pressure-sensitive discoloration base material. By performing an operation of the interfacial contact resistance between the porous body and the gas diffusion layer, the thermal and electrical losses of the fuel cell stack by the porous body can be predicted, whereby the fuel cell stack having excellent reliability, productivity and power generation efficiency can be manufactured.

The preferred embodiments of the present invention as described above are disclosed for exemplary purpose, where those skilled in the art having ordinary knowledge for the present invention can make various corrections, modifications and additions within idea and scope of the present invention, and such a correction, modification and addition should be considered as falling within the scope of the following claims.

The preferred embodiments of the present invention as described above are disclosed for exemplary purpose, where those skilled in the art having ordinary knowledge for the present invention can make various corrections, modifications and additions within idea and scope of the present invention, and such a correction, modification and addition should be considered as falling within the scope of the following claims.

INDUSTRIAL APPLICABILITY

According to the porous body quality inspection apparatus and the method for inspecting quality of a porous body related to the present invention, the thermal and electrical losses of the fuel cell stack by the porous body can be quantified, and the manufacturing tolerance and the surface pressure uniformity of the porous body can be quantitatively confirmed.

What is claimed is:

1. A porous body quality inspection apparatus comprising:
a measuring part for measuring a contact resistance between a porous body and a gas diffusion layer;
a pressurizing part for pressurizing a pressure-sensitive discoloration base material on the porous body;
an image mapping part for calculating a contact area between the pressure-sensitive discoloration base material and the porous body based on a discolored region of the pressurized pressure-sensitive discoloration base material;
a transporting part for transporting the porous body and the pressure-sensitive discoloration base material; and
an operation part for determining an interfacial contact resistance between the porous body and the gas diffusion layer based on the contact resistance and the contact area,
wherein the operation part is configured to determine the interfacial contact resistance using Equation 1 below:

$$ICR = R_{BP|GDL} \times AC_{actual} \qquad \text{[Equation 1]}$$

wherein, ICR is the interfacial contact resistance between the porous body and the gas diffusion layer, $R_{BP|GDL}$ is the contact resistance between the porous body and the gas diffusion layer, and $AC_{actual}$ is the contact area between the pressure-sensitive discoloration base material and the porous body calculated based on the discolored region of the pressurized pressure-sensitive discoloration base material.

2. The porous body quality inspection apparatus according to claim 1, wherein the measuring part comprises a holder on which the gas diffusion layer is disposed and a contact resistance measurement sensor.

3. The porous body quality inspection apparatus according to claim 1, wherein the pressurizing part comprises a pressure-sensitive discoloration base material transport roller and a pressure roller.

4. The porous body quality inspection apparatus according to claim 3, wherein the pressurizing part is configured to pressurize the pressure-sensitive discoloration base material that is placed on the porous body by the pressure-sensitive discoloration base material transport roller by a predetermined pressure using the pressure roller.

5. The porous body quality inspection apparatus according to claim 4, wherein the gas diffusion layer is a first gas diffusion layer, and the porous body is configured to contact a second gas diffusion layer of a fuel cell stack, and wherein the predetermined pressure is a pressure corresponding to a pressure on the porous body when the porous body contacts the second gas diffusion layer of the fuel cell stack.

6. The porous body quality inspection apparatus according to claim 1, wherein the image mapping part comprises a collection part for separately collecting the pressurized pressure-sensitive discoloration base material from the porous body and a scanner for scanning the discolored region of the collected pressure-sensitive discoloration base material.

7. The porous body quality inspection apparatus according to claim 1, wherein the measuring part comprises a gauge sensor for measuring a thickness of the porous body.

8. The porous body quality inspection apparatus according to claim 1, further comprising a weight measuring part for measuring a weight of the porous body.

9. The porous body quality inspection apparatus according to claim 8, wherein the weight measuring part comprises a tray supported by an elastic body, in which the porous body is stacked and housed.

10. The porous body quality inspection apparatus according to claim 1, further comprising a product selection part including a vacuum adsorption part.

11. The porous body quality inspection apparatus according to claim 1, comprising a display part for outputting one or more of the contact resistance, the contact area and the interfacial contact resistance.

12. A method for inspecting quality of a porous body, the method comprising:
- measuring a contact resistance between a porous body and a gas diffusion layer;
- pressurizing a pressure-sensitive discoloration base material that is placed on the porous body by a predetermined pressure;
- calculating a contact area between the pressure-sensitive discoloration base material and the porous body based on a discolored region of the pressurized pressure-sensitive discoloration base material; and
- determining an interfacial contact resistance between the porous body and the gas diffusion layer based on the contact resistance and the contact area, wherein determining the interfacial contact resistance comprises determining the interfacial contact resistance using Equation 1 below:

$$ICR = R_{BP|GDL} \times AC_{actual} \quad \text{[Equation 1]}$$

wherein, ICR is the interfacial contact resistance between the porous body and the gas diffusion layer, $R_{BP|GDL}$ is the contact resistance between the porous body and the gas diffusion layer, and $AC_{actual}$ is the contact area between the pressure-sensitive discoloration base material and the porous body calculated based on the discolored region of the pressurized pressure-sensitive discoloration base material.

13. The method for inspecting quality of a porous body according to claim 12, wherein the gas diffusion layer is a first gas diffusion layer, and the porous body is configured to contact a second gas diffusion layer of a fuel cell stack, and wherein the predetermined pressure is a pressure corresponding to a pressure on the porous body when the porous body contacts the second gas diffusion layer of the fuel cell stack.

* * * * *